(12) United States Patent
Ishii et al.

(10) Patent No.: US 11,819,807 B2
(45) Date of Patent: Nov. 21, 2023

(54) POROUS MEMBRANE AND FILTER CARTRIDGE

(71) Applicant: FUJIFILM Corporation, Tokyo (JP)

(72) Inventors: Akihiro Ishii, Kanagawa (JP); Takeshi Umehara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 81 days.

(21) Appl. No.: 16/910,253

(22) Filed: Jun. 24, 2020

(65) Prior Publication Data

US 2021/0023510 A1  Jan. 28, 2021

(30) Foreign Application Priority Data

Jul. 24, 2019  (JP) ................. 2019-136175

(51) Int. Cl.
| | | |
|---|---|---|
| *B01D 71/68* | (2006.01) | |
| *C08G 75/23* | (2006.01) | |
| *C08L 81/06* | (2006.01) | |
| *C08J 5/18* | (2006.01) | |
| *B01D 71/22* | (2006.01) | |
| *B01D 69/02* | (2006.01) | |

(52) U.S. Cl.
CPC ............ *B01D 71/68* (2013.01); *B01D 69/02* (2013.01); *B01D 71/22* (2013.01); *C08G 75/23* (2013.01); *C08J 5/18* (2013.01); *C08L 81/06* (2013.01); *B01D 2313/44* (2013.01); *B01D 2325/022* (2013.01); *B01D 2325/04* (2013.01); *C08J 2381/06* (2013.01); *C08J 2401/28* (2013.01)

(58) Field of Classification Search
CPC ........ B01D 71/68; B01D 69/02; B01D 71/22; B01D 2313/44; B01D 2325/022; B01D 2325/04; B01D 71/12; B01D 71/80; B01D 67/0002; C08G 75/23; C08G 65/4056; C08J 5/18; C08J 2381/06; C08J 2401/28; C08J 2401/10; C08J 2481/06; C08J 7/056; C08L 81/06

See application file for complete search history.

(56) References Cited

U.S. PATENT DOCUMENTS

| | | | |
|---|---|---|---|
| 2006/0121267 A1 | 6/2006 | Tsuyumoto et al. | |
| 2007/0084788 A1 | 4/2007 | Moya et al. | |
| 2010/0294713 A1 | 11/2010 | Tsuzawa et al. | |
| 2015/0021261 A1 | 1/2015 | Shiotani et al. | |
| 2015/0232506 A1* | 8/2015 | Ashitaka ................ | B01D 69/08 427/244 |
| 2016/0038884 A1 | 2/2016 | Hikita et al. | |
| 2017/0266626 A1 | 9/2017 | Kayama et al. | |
| 2019/0262509 A1 | 8/2019 | Mochizuki et al. | |
| 2020/0024575 A1* | 1/2020 | Harimoto ............ | A61M 1/3496 |

FOREIGN PATENT DOCUMENTS

| | | |
|---|---|---|
| CN | 1694791 A | 11/2005 |
| CN | 103975005 A | 8/2014 |
| CN | 105209162 A | 12/2015 |
| CN | 106573203 A | 4/2017 |
| CN | 109922839 A | 6/2019 |
| JP | 54-144456 A | 11/1979 |
| JP | 56-86941 A | 7/1981 |
| JP | 57-126847 A | 8/1982 |
| JP | 2001-149763 A | 6/2001 |
| JP | 2003-311132 A | 11/2003 |
| JP | 2003-320230 A | 11/2003 |
| JP | 2007-136449 A | 6/2007 |
| WO | 2009/050850 A1 | 4/2009 |

OTHER PUBLICATIONS

Office Action dated Jul. 19, 2022 issued by the Japanese Patent Office in Japanese Application No. 2019-136175.
Jiang Tigan et al., "Chemical Technology Handbook, 1st edition", Shanghai Science and Technology Press, p. 669, 1992 (3 pages).
Yang Guisheng et al., "China's strategic emerging industry-new material engineering plastics", China Railway Press, p. 279, 2017, 1st Edition (3 pages).
Office Action dated Jul. 7, 2023 in Chinese Application No. 202010547019.3.

* cited by examiner

*Primary Examiner* — Krishnan S Menon
(74) *Attorney, Agent, or Firm* — Sughrue Mion, PLLC

(57) ABSTRACT

A porous membrane includes a polymer which includes one or more structural units selected from the group consisting of a structural unit represented by Formula (I) and a structural unit represented by Formula (II), in which a content of the structural unit represented by Formula (II) is 1% by mass or more and less than 10% by mass with respect to a total mass of the structural unit represented by Formula (I) and the structural unit represented by Formula (II)

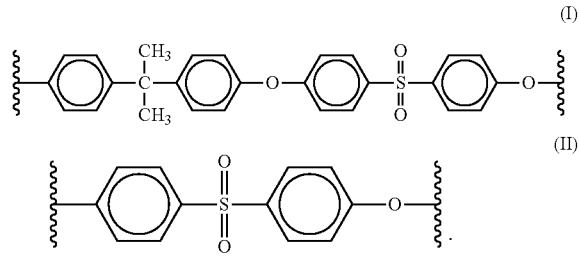

11 Claims, No Drawings

POROUS MEMBRANE AND FILTER CARTRIDGE

CROSS-REFERENCE TO RELATED APPLICATIONS

The present application claims priority under 35 U.S.C. § 119 to Japanese Patent Application No. 2019-136175 filed on Jul. 24, 2019. Each of the above application is hereby expressly incorporated by reference, in its entirety, into the present application.

BACKGROUND OF THE INVENTION

1. Field of the Invention

The present invention relates to a porous membrane. The present invention also relates to a filter cartridge using the porous membrane.

2. Description of the Related Art

A porous membrane formed of a polymer is industrially useful as a filtration membrane, such as an application of water purification, and a product in which the porous membrane is pleated and stored in a cartridge having a fixed volume is also commercially available. As the polymer which can be used for manufacturing the porous membrane, polysulfone or polyethersulfone has been well known in the related art (JP1979-144456A (JP-S54-144456A)).

A porous membrane formed of polysulfone has high water resistance, chemical resistance, and mechanical resistance. However, since the porous membrane formed of polysulfone has high hydrophobicity, in a case of carrying out an integrity test, an erroneous determination in which a defect is present in the porous membrane may be made. The integrity test is a test carried out to confirm the presence or absence of defects such as a pinhole or a defective seal of the filtration membrane. In the integrity test, water was passed through the filtration membrane attached to a filter device to fill pores with water, and then pressure is applied to the filtration membrane to observe gas leakage. At this time, in a case where the filtration membrane is not wetted by water and has pores which are not filled up with water, gas can leak in a case of applying pressure even in a case where the pinhole does not exist, therefore the integrity cannot be determined. That is, in a case where the filtration membrane is hydrophobic, it is difficult to accurately confirm the presence or absence of defects by the integrity test.

Comparing with the porous membrane formed of polysulfone, since a porous membrane formed of polyethersulfone has a material of hydrophilicity, the porous membrane formed of polyethersulfone has higher water permeability but lower mechanical resistance.

SUMMARY OF THE INVENTION

An object of the present invention is to provide a porous membrane which has high hardness and can pass the integrity test in a case of being used as a filtration membrane of a filter cartridge.

In order to achieve the object, the present inventors have focused on mixing polysulfone and polyethersulfone. JP1979-144456A (JP-S54-144456A) describes a manufacture of a porous membrane from a solution including both polysulfone and polyethersulfone. However, as a result of intensive studies, the present inventors have found that, by mixing both at a different mass ratio from that described in JP1979-144456A (JP-S54-144456A), a porous membrane which achieves both hardness and hydrophilicity capable of withstanding the integrity test is obtained, further studied based on the finding, thereby achieving the object.

That is, the present invention provides the following <1> to <10>.

<1> A porous membrane comprising:
a polymer which includes one or more structural units selected from the group consisting of a structural unit represented by Formula (I) and a structural unit represented by Formula (II),
in which a content of the structural unit represented by Formula (II) is 1% by mass or more and less than 10% by mass with respect to a total mass of the structural unit represented by Formula (I) and the structural unit represented by Formula (II), and
a structural unit which is represented by Formula (II) and is a part of the structural unit represented by Formula (I) is excluded from the structural unit represented by Formula (II).

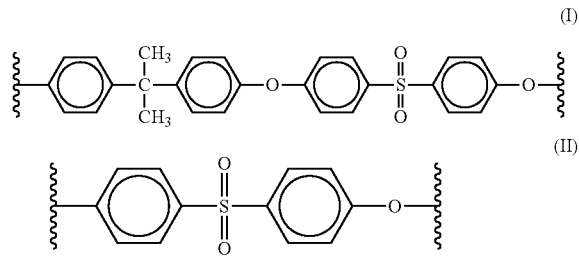

<2> The porous membrane according to <1>,
in which polysulfone consisting of a repetition of the structural unit represented by Formula (I) and polyethersulfone consisting of the structural unit represented by Formula (II) are included as the polymer.

<3> The porous membrane according to <1> or <2>, further comprising:
a hydroxyalkyl cellulose.

<4> The porous membrane according to <3>,
in which, in a case where the content of the structural unit represented by Formula (II) is a % by mass and a content of the hydroxyalkyl cellulose with respect to a mass of the porous membrane is b % by mass, the following expression is satisfied $0.5 \leq a \times b \leq 1.8$.

<5> The porous membrane according to <3> or <4>,
in which the hydroxyalkyl cellulose is hydroxypropyl cellulose.

<6> The porous membrane according to any one of <1> to <5>,
in which a thickness is 10 μm to 500 μm.

<7> The porous membrane according to any one of <1> to <6>,
in which a layered compact portion of which a pore diameter is minimum is provided at an inside of the porous membrane, and
the pore diameter continuously increases in a thickness direction from the compact portion toward at least one membrane surface of the porous membrane.

<8> The porous membrane according to <7>,
in which an average pore diameter of the compact portion is 0.1 μm to 10 μm.

<9> A porous membrane comprising:
polysulfone consisting of a repetition of a structural unit represented by Formula (I), polyethersulfone consisting of a structural unit represented by Formula (II), and a hydroxypropyl cellulose,
in which a content of the polysulfone is 1% by mass or more and less than 10% by mass with respect to a total mass of the polysulfone and the polyethersulfone,
a structural unit which is represented by Formula (II) and is a part of the structural unit represented by Formula (I) is excluded from the structural unit represented by Formula (II),
in a case where the content of the polyethersulfone is a % by mass and a content of the hydroxypropyl cellulose with respect to a mass of the porous membrane is b % by mass, the following expression is satisfied $$0.5 \leq a \times b \leq 1.8,$$

a thickness is 10 μm to 500 μm,
a layered compact portion of which a pore diameter is minimum is provided at an inside of the porous membrane,
an average pore diameter of the compact portion is 0.1 μm to 10 μm, and
the pore diameter continuously increases in a thickness direction from the compact portion toward at least one membrane surface of the porous membrane.

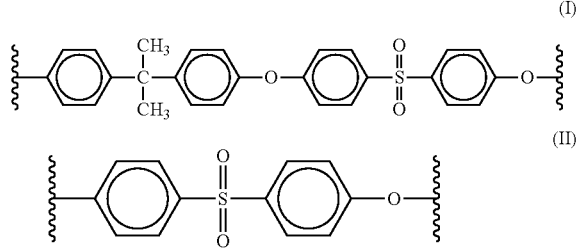

<10> A filter cartridge comprising:
the porous membrane according to any one of <1> to <9> as a filtration membrane.

The present invention provides a porous membrane which has high hardness and can pass the integrity test in a case of being used as a filtration membrane of a filter cartridge.

DESCRIPTION OF THE PREFERRED EMBODIMENTS

Hereinafter, the present invention will be described in detail.

In the present specification, "to" is used to refer to a meaning including numerical values denoted before and after "to" as a lower limit value and an upper limit value.

[Porous Membrane]

(Composition of Porous Membrane)

The porous membrane according to an embodiment of the present invention includes a polymer which include one or more structural units selected from the group consisting of a structural unit represented by Formula (I) and a structural unit represented by Formula (II). The structural unit represented by Formula (I) is a polysulfone repeating unit. The structural unit represented by Formula (II) is a polyethersulfone repeating unit.

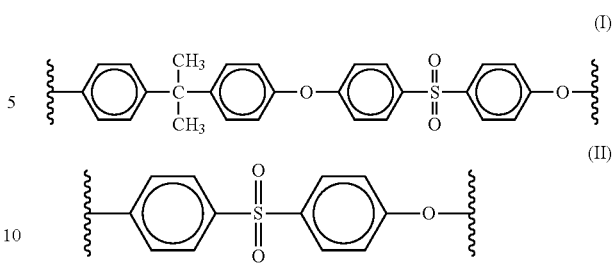

Examples of the polymer which includes one or more structural units selected from the group consisting of the structural unit represented by Formula (I) and the structural unit represented by Formula (II) include polysulfone and polyethersulfone, and a copolymer including the polysulfone repeating unit and the polyethersulfone repeating unit. As can be understood from the content of polyethersulfone described later, the porous membrane according to the embodiment of the present invention includes both structural units of the structural unit represented by Formula (I) and the structural unit represented by Formula (II). Therefore, the porous membrane according to the embodiment of the present invention includes polysulfone and polyethersulfone, a copolymer including the polysulfone repeating unit and the polyethersulfone repeating unit, or a copolymer including the polysulfone repeating unit and the polyethersulfone repeating unit and one or more compounds selected from polysulfone and polyethersulfone.

It is preferable that the porous membrane according to the embodiment of the present invention consists of a polymer of which a skeleton substantially includes one or more structural units selected from the group consisting of the structural unit represented by Formula (I) and the structural unit represented by Formula (II). That is, it is preferable that the skeleton of the porous membrane according to the embodiment of the present invention consists of polysulfone and polyethersulfone, a copolymer including the polysulfone repeating unit and the polyethersulfone repeating unit, or a copolymer including the polysulfone repeating unit and the polyethersulfone repeating unit and one or more compounds selected from polysulfone and polyethersulfone. Here, the skeleton means a portion which can form a porous membrane by itself, and means a portion which functions as a substrate retaining an additional component such as a hydrophilic material described later. A porous membrane formed of a water-insoluble resin such as polysulfone and polyethersulfone generally has high water resistance, chemical resistance, and mechanical resistance, and is suitable for industrial use as a filter. A porous membrane having higher water resistance, chemical resistance, and mechanical resistance can be obtained by using, as the water-insoluble resin, the polymer which includes one or more structural units selected from the group consisting of the structural unit represented by Formula (I) and the structural unit represented by Formula (II), particularly polysulfone.

The polymer which includes one or more structural units selected from the group consisting of the structural unit represented by Formula (I) and the structural unit represented by Formula (II) may have a structural portion other than the structural unit represented by Formula (I) or the structural unit represented by Formula (II), but is preferably composed of the structural unit represented by Formula (I) or the structural unit represented by Formula (II) substantially.

The number average molecular weight (Mn) of the polymer which includes one or more structural units selected from the group consisting of the structural unit represented by Formula (I) and the structural unit represented by Formula (II) is preferably 1,000 to 10,000,000 and more preferably 5,000 to 1,000,000. Here, the number average molecular weight (Mn) of a polymer is obtained by gel permeation chromatography (GPC).

In a case where the skeleton of the porous membrane according to the embodiment of the present invention is composed of a plurality types of polymers, a plurality of polymers is generally easier to mix with each other as the molecular weight is smaller. From the viewpoint, it can be said that the molecular weight of each polymer is preferably small. However, the molecular weight does not affect the effect as long as the polymers are mixed with each other. From the viewpoint, it can be said that the molecular weight is the maximum molecular weight in which each polymer can be mixed with each other in a solution used to form a porous membrane.

In the porous membrane according to the embodiment of the present invention, the content (hereinafter, referred to as "content of polyethersulfone) of the structural unit represented by Formula (II) (excluding the structural unit represented by Formula (I)) is 1% by mass or more and less than 10% by mass with respect to the total mass of the structural unit represented by Formula (I) and the structural unit represented by Formula (II). The present inventors have found that a porous membrane which achieves both hardness and hydrophilicity capable of withstanding the integrity test is obtained by the range.

The content of polyethersulfone can be calculated from $^1$H-NMR of a solution in which a porous membrane is dissolved, and specifically, can be calculated according to the procedure described in Examples.

The content of polyethersulfone is preferably 1% by mass to 7% by mass, more preferably 1% by mass to 5% by mass, more preferably 2% by mass to 5% by mass, and even more preferably approximately 2% by mass.

(Structure of Porous Membrane)

The porous membrane is a membrane having a plurality of pores. The pores can be confirmed by, for example, captured images of a scanning electron microscope (SEM) or captured images of a transmission electron microscope (TEM) of a cross section of the membrane.

The pore diameter of the pores in the porous membrane can be appropriately selected depending on the size of a filtration object, and may be 0.005 μm to 25 μm and more preferably 0.01 μm to 20 μm. In a case of having pore diameter distribution, it is sufficient that the pores are distributed within the range. A pore diameter may be measured from an image of a cross section of the membrane obtained by an electron microscope. The porous membrane can be cut with a microtome or the like, and it is possible to obtain an image of the cross section of the porous membrane as a section of a thin membrane in which a cross section can be observed.

The porous membrane may have a structure having a pore diameter distribution in a thickness direction, or may have a homogeneous structure not having pore diameter distribution in the thickness direction. In addition, the structure having a pore diameter distribution in the thickness direction may be a structure (asymmetric structure) which is asymmetric in the thickness direction with a pore diameter distribution such that the pore diameter of a front surface of the membrane and the pore diameter of a back surface of the membrane are different. Examples of the asymmetric structure include a structure in which the pore diameter continuously increases from one surface of the membrane toward another surface of the membrane in the thickness direction, and a structure in which a layered compact portion with a minimum pore diameter is provided at an inside of the porous membrane, and the pore diameter continuously increases in a thickness direction from the compact portion toward at least one membrane surface of the porous membrane.

In the present specification, in the porous membrane of the asymmetric structure, a surface having larger pore diameter is referred to as a primary surface, and a surface having smaller pore diameter is referred to as a secondary surface.

In particular, it is preferable that the porous membrane has a structure in which a layered compact portion with a minimum pore diameter is provided at an inside of the porous membrane, and the pore diameter continuously increases in a thickness direction from the compact portion toward at least one membrane surface of the porous membrane. The polymer which includes one or more structural units selected from the group consisting of the structural unit represented by Formula (I) and the structural unit represented by Formula (II), such as polysulfone and polyethersulfone, is well known as a polymer which can be preferably used in a case of manufacturing such a porous membrane.

In the present specification, in a case of comparing pore diameters in the thickness direction of the membrane, the comparison is performed by dividing the SEM image of the cross section of the membrane in the thickness direction of the membrane. The number of divisions can be appropriately selected according to the thickness of the membrane. The number of divisions is at least 5 or more, and for example, in a membrane having a thickness of 200 μm, 19 parting lines for divide the surface X described later into 20 parts are drawn, holes (closed holes) crossing or in contact with each parting line are traced with a digitizer, and an average pore diameter of 50 consecutive holes is used to obtain the number of divisions. The size of the division width means the size of the width in the thickness direction of the membrane, and does not mean the size of the width in the image. In the comparison of the pore diameters in the thickness direction of the membrane, the pore diameters are compared by the average pore diameter of each section. It is sufficient that the average pore diameter of each section is, for example, an average value of 50 holes in each section of the membrane cross-sectional view. The membrane cross-sectional view in this case may be obtained, for example, with a width of 80 μm (distance of 80 μm in a direction parallel to the surface). In this case, in a section in which the holes are large and 50 holes cannot be measured, it is sufficient that the average value is obtained by measuring the number of holes which can be taken in the section. In addition, at this time, in a case where a hole is too large to fit in the section, the size of the hole is measured over other sections.

The layered compact portion having the minimum pore diameter refers to a layered portion of the porous membrane corresponding to a section having the minimum average pore diameter among the sections of the cross section of the membrane. The compact portion may consist of a portion corresponding to one section, or may consist of a portion corresponding to a plurality of sections, such as two sections and three sections, having an average pore diameter within 1.1 times the section having the minimum average pore diameter. It is sufficient that a thickness of the compact portion is 0.5 μm to 50 μm, preferably 0.5 μm to 30 μm.

In a porous membrane used as a filtration membrane for industrial application, particularly in a porous membrane used as a filtration membrane for filtration of beverages such as beer, since achieving both a high flow rate and reliable capture of contaminants in the liquid is important, appropriate setting of the minimum pore diameter is required.

In the present specification, an average pore diameter of the compact portion refers to the minimum pore diameter of the porous membrane. The minimum pore diameter of the porous membrane is preferably 0.01 μm or more, more preferably 0.03 μm or more, even more preferably 0.05 μm or more, and particularly preferably 0.1 μm or more, and preferably 10 μm or less, more preferably 5 μm or less, and even more preferably 3 μm or less.

Here, the average pore diameter of the compact portion is measured by ASTM F316-80.

The porous membrane preferably has the compact portion within the inside. The "inside" means that the compact portion is not in contact with the surface of the membrane. The phrase "having the compact portion within the inside" means that the compact portion is not the closest section to any surface of the membrane. By using the porous membrane having a structure having the compact portion within the inside, permeability of substances intended to permeate is unlikely to lower compared to a case of using a porous membrane having the same compact portion which is in contact with the surface thereof. Although not bound by any theory, it is considered that the substances are hardly adsorbed due to the presence of the compact portion within the inside.

It is preferable that the compact portion is biased to one of the front surface side than a central portion in the thickness of the porous membrane. Specifically, the compact portion is preferably located between any one surface of the porous membrane and a portion at a distance of one-third of the thickness of the porous membrane from the surface, more preferably located between any one surface of the porous membrane and a portion at a distance of two-fifths of the thickness of the porous membrane from the surface, and even more preferably located between any one surface of the porous membrane and a portion at a distance of a quarter of the thickness of the porous membrane from the surface. It is sufficient that the distance is determined from the image of the cross section of the membrane described above. In the present specification, the surface of the porous membrane closer to the compact portion is referred to as a "surface X."

In the porous membrane, it is preferable that a pore diameter continuously increases in the thickness direction from the compact portion toward at least one of the surfaces. In the porous membrane, the pore diameter may continuously increase in the thickness direction toward the surface X from the compact portion, the pore diameter may continuously increase in the thickness direction toward the surface opposite to the surface X from the compact portion, and the pore diameter may continuously increase in the thickness direction toward any surface of the porous membrane from the compact portion. Among these, it is preferable that the pore diameter continuously increases in the thickness direction toward at least the surface opposite to the surface X from the compact portion, and it is more preferable that the pore diameter continuously increases in the thickness direction toward any surface of the porous membrane from the compact portion. The phrase "the pore diameter continuously increases in the thickness direction" means that a difference in average pore diameters between the sections adjacent to each other in the thickness direction increases by 50% or less of a difference between maximum average pore diameters (maximum pore diameters) and minimum average pore diameters (minimum pore diameters), preferably increases by 40% or less and more preferably increases by 30% or less. The phrase "continuously increasing" essentially means that a pore diameter increases uniformly without decreasing, but a decreasing portion may occur accidentally. For example, in a case of combining two sections from the surface, in a case where an average value of a combination increases uniformly (uniformly decreases toward the compact portion from the surface), it can be determined that "the pore diameter continuously increases in the thickness direction toward the surface of the membrane from the compact portion".

The maximum pore diameter of the porous membrane is preferably more than 0.1 μm, more preferably 1.0 μm or more, and even more preferably more than 1.5 μm, and preferably 25 μm or less, more preferably 23 μm or less, and even more preferably 21 μm or less. In the present specification, an average pore diameter of the section having the maximum average pore diameter among the sections of the cross section of the membrane is referred to as the maximum pore diameter of the porous membrane.

A ratio of the average pore diameter of the compact portion to the maximum pore diameter of the porous membrane (ratio of the minimum pore diameter to the maximum pore diameter of the porous membrane, which is a value obtained by dividing the maximum pore diameter by the minimum pore diameter, also referred to as an "anisotropy ratio" in the present specification) is preferably 3 or more, is more preferably 4 or more, and is even more preferably 5 or more. The reason is that an average pore diameter except for that of the compact portion increases so that substance permeability of the porous membrane increases. In addition, the anisotropy ratio is preferably 25 or less, and more preferably 20 or less. The reason is that effects, as though multistage filtration would be carried out, can be efficiently obtained within a range in which an anisotropy ratio is 25 or less.

It is preferable that a section with a maximum average pore diameter is a section closest to any surface of the membrane or a section in contact with the section with a maximum average pore diameter.

In the section closest to any surface of the membrane, it is preferable that an average pore diameter is more than 0.05 μm and 25 μm or less, more preferably more than 0.08 μm and 23 μm or less, and even more preferably more than 0.1 μm and 21 μm or less. In addition, a ratio of the average pore diameter of the compact portion to the average pore diameter of the section closest to any surface of the membrane is preferably 1.2 to 20, is more preferably 1.5 to 15, and is even more preferably 2 to 13.

A thickness of the porous membrane is not particularly limited, but from the viewpoint of membrane hardness, handleability, filtration performance, and filter life, is preferably 10 μm to 500 μm, more preferably 30 μm to 400 μm, and even more preferably 50 μm to 300 μm.

The porous membrane is preferably a membrane formed from a single composition as a single layer, and preferably does not have a laminated structure of a plurality of layers.

<Hydrophilic Material and the Like>

In the porous membrane according to the embodiment of the present invention, the skeleton thereof may further retain other materials. Examples of the other materials include a hydrophilic material. The phrase "being retained by the porous membrane" means that the other materials are bonded to the porous membrane such an extent that the other materials are not easily peeled off during storage or use of the porous membrane. For example, the skeleton of the porous membrane and the hydrophilic material may be bonded to each other by hydrophobic interaction.

[Polyvinylpyrrolidone]

It is preferable that the porous membrane further includes polyvinylpyrrolidone. Polysulfone which is hydrophobic has high hydrophilicity by including polyvinylpyrrolidone. For example, polyvinylpyrrolidone is added as a pore-forming agent to a stock solution for forming a porous membrane having a skeleton described in JP1989-034403A (JP-S64-034403A). Most of polyvinylpyrrolidone in the stock solution for forming a membrane is dissolved and removed in coagulation water during a process of forming a membrane, but a part thereof remains on the membrane surface.

[Hydroxyalkyl Cellulose]

The porous membrane according to the embodiment of the present invention may be further hydrophilized with hydroxyalkyl cellulose. Hydrophobicity of the cellulose skeleton in the hydroxyalkyl cellulose contributes to the hydrophobic interaction with the porous membrane as a substrate so that the hydroxyalkyl cellulose is retained by the porous membrane, and a hydroxy group or a hydroxypropyl group of a side chain of the hydroxyalkyl cellulose imparts hydrophilicity to the porous membrane. It is assumed that, since the hydroxyalkyl cellulose has high intermolecular force, the molecules interact strongly in the porous membrane and can be retained in the membrane without being easily washed off before and after filtration. Furthermore, since the hydroxyalkyl cellulose is a component which can be used as a food additive, the hydroxyalkyl cellulose is not necessary to be washed off after producing a filter cartridge. Therefore, the processing load is small and the product is safe even in a case of performing hydrophilization with the hydroxyalkyl cellulose.

As the hydroxyalkyl cellulose, a hydroxyalkyl cellulose obtained by adding an alkylene oxide having 3 to 5 carbon atoms to cellulose is preferable. This is because the interaction with a substrate porous membrane and the hydrophilicity of the porous membrane can be obtained in a preferred range for practical use. Among these, hydroxypropyl cellulose obtained by adding propylene oxide (having 3 carbon atoms) to cellulose is most preferable. In a case where the number of addition (degree of substitution) of the alkylene oxide is large, the hydrophilicity increases, and in a case where the number of addition (degree of substitution) of the alkylene oxide is small, the hydrophilicity decreases. From the viewpoint, the molar degree of substitution is preferably 1 or more and more preferably 2 or more.

The weight-average molecular weight of the hydroxyalkyl cellulose is preferably 10,000 to 1,000,000. By setting the weight-average molecular weight to 1,000,000 or less, it is possible to prevent the pores of the membrane from being covered too much and from decreasing in water permeability. In addition, by setting the weight-average molecular weight to 10,000 or more, the interaction between the hydroxyalkyl cellulose and the substrate porous membrane can be ensured, and the hydroxyalkyl cellulose can be hardly desorbed.

The weight-average molecular weight of the hydroxyalkyl cellulose can be evaluated by GPC measurement under the following analysis conditions.

Column: Shodex OHpak KB805HQ
Moving phase: 0.1 M sodium acetate buffer
Flow rate: 1.0 mL/min
Temperature: 40° C.
Detector: differential refractometer (RI)

The molecular weight can be calculated by using standard pullulan sample Shodex Pullulan P-5, P-10, P-20, P-50, P-82, P-100, P-200, P-400, P-800, P-1600.

With regard to a portion (portion in which the hydroxyalkyl cellulose is permeated) retaining the hydroxyalkyl cellulose, the content of the hydroxyalkyl cellulose is preferably 0.02% to 3% by mass and more preferably 0.05% to 1.0% by mass with respect to the mass of the porous membrane. The content of the hydroxyalkyl cellulose in the porous membrane can be measured, for example, by the method described in Examples.

In addition, with regard to a portion (portion in which the hydroxyalkyl cellulose is permeated) retaining the hydroxyalkyl cellulose, it is preferable that the content (referred to as a % by mass) of the structural unit represented by Formula (II) and b % by mass which is the content of the hydroxyalkyl cellulose with respect to the mass of the porous membrane satisfy the following expression.

$$0.5 \leq a \times b \leq 1.8$$

a×b is more preferably 1.5 or less, even more preferably 1.2 or less, and most preferably 0.8 to 1.0.

The content of the structural unit represented by Formula (II) is within a certain range as described above, and by not exceeding the range, it is possible to prevent the hydroxyalkyl cellulose from aggregating in the structural unit portion and causing the porous membrane from being easily clogged partially. On the other hand, by suppressing the amount of hydroxyalkyl cellulose to satisfy the expression, it is possible to prevent the hydroxyalkyl cellulose from aggregating with each other and to prevent the compact portion of the porous membrane from being closed and clogging.

In a case where the skeleton of the porous membrane is hydrophilized by the hydroxyalkyl cellulose, the porous membrane may retain the hydroxyalkyl cellulose on the entire surface or only a part thereof. By retaining the hydroxyalkyl cellulose on the entire surface, hydrophilicity of the entire porous membrane can be preferably achieved. In addition, by performing hydrophilization only on a part which is required to be hydrophilic particularly, it is possible to achieve hydrophilicity within a necessary range while utilizing the properties of the porous membrane as a substrate.

Examples of the aspect in which the porous membrane according to the embodiment of the present invention retains the hydroxyalkyl cellulose only on a part in an area direction preferably include a long sheet-like porous membrane which retains the hydroxyalkyl cellulose only at both long side end portions. For example, in a case of a porous membrane having a length of 20 to 35 cm in a short side, it is sufficient that the both long side end portions are portions within 4 cm, more preferably within 2 cm, from the edge of the long side of the porous membrane in the short direction. In a case where the porous membrane is used as a filtration membrane of a filter cartridge, a load is likely to be applied at both end portions. That is, the long sheet-like porous membrane is pleated if necessary and rounded into a cylindrical shape, the joint is sealed, and the both end portions of the cylinder are fusion-welded to a plate called an end plate of a cartridge. In a case of fusion welding, the porous membrane is heated and hydrophobized so that gas leakage easily occurs in the integrity test. In a case of particularly increasing the hydrophilicity of the both end portions to which heat is applied by retaining the hydroxyalkyl cellulose, a porous membrane which can prevent deterioration in hydrophilicity from a process for producing a cartridge is obtained, and a filter cartridge which passes the integrity test can be produced using the porous membrane.

Therefore, it is preferable that the long sheet-like porous membrane, particularly a long sheet-like porous membrane used as a filtration membrane of a filter cartridge, retains the hydroxyalkyl cellulose at least at the both long side end portions.

The porous membrane may include other components as an additive, in addition to the polymer.

Examples of the additive include metal salts of inorganic acid such as sodium chloride, lithium chloride, sodium nitrate, potassium nitrate, sodium sulfate, and zinc chloride; metal salts of organic acid such as sodium acetate and sodium formate; polymers such as polyethylene glycol and polyvinylpyrrolidone; polymer electrolytes such as sodium polystyrene sulfonate and polyvinyl benzyl trimethyl ammonium chloride; and ionic surfactants such as sodium dioctyl sulfosuccinate and sodium alkylmethyltauratetaurate. The additive may act as a swelling agent for a porous structure.

[Method for Manufacturing Porous Membrane]

(Method for Manufacturing Porous Membrane (Substrate))

A method for manufacturing the porous membrane according to the embodiment of the present invention is not particularly limited, and any general methods for forming a polymer membrane can be used. Examples of the methods for forming a polymer membrane include a stretching method and a flow-casting method, and it is particularly preferable to use a flow-casting method for manufacturing a porous membrane. In the flow-casting method, it is possible to produce a porous membrane having a pore diameter distribution by adjusting the type and amount of a solvent used in a stock solution for forming a membrane, or a drying method after flow-casting.

Manufacture of a porous membrane by the flow-casting method can be carried out by a method including, for example, the following (1) to (4) in this order.

(1) A stock solution for forming a membrane, which contains a polymer, if necessary an additive, and if necessary a solvent, is cast on a support while being in a dissolved state.

(2) The surface of the cast liquid membrane is exposed to temperature-controlled humid air.

(3) The membrane obtained after being exposed to temperature-controlled humid air is immersed in a coagulation liquid.

(4) A support is peeled off if necessary.

It is sufficient that a temperature of temperature-controlled humid air is 4° C. to 60° C., preferably 10° C. to 40° C. It is sufficient that a relative humidity of the temperature-controlled humid air is 15% to 100%, preferably 25% to 95%. It is sufficient that the temperature-controlled humid air is applied at a wind speed of 0.1 m/s to 10 m/s for 0.1 seconds to 30 seconds, preferably 1 second to 10 seconds.

In addition, the average pore diameter and position of the compact portion can also be controlled by a moisture concentration contained in the temperature-controlled humid air and a time of applying the temperature-controlled humid air. The average pore diameter of the compact portion can also be controlled by an amount of moisture contained in a stock solution for forming a membrane.

By applying the temperature-controlled humid air to the surface of the liquid membrane as described above, it is possible to cause coacervation from the surface of the liquid membrane toward the inside of the membrane by controlling evaporation of a solvent. By immersing the membrane in a coagulation liquid containing a solvent which has low solubility of the polymer and is compatible with the solvent of the polymer in this state, the above-mentioned coacervation phase is fixed as fine pores, and pores other than the fine pores can also be formed.

It is sufficient that a temperature of the coagulation liquid in a process of immersing the membrane in the coagulation liquid is −10° C. to 80° C. By changing temperature during this period, it is possible to control a size of a pore diameter up to a support surface side by adjusting time from the formation of the coacervation phase on the support surface side to the coagulation from the compact portion toward the support surface side. In a case where a temperature of the coagulation liquid is raised, the formation of the coacervation phase becomes faster and a time for coagulation becomes longer, therefore the pore diameter toward the support surface side tends to become large. On the other hand, in a case where a temperature of the coagulation liquid is lowered, the formation of the coacervation phase becomes slower and a time for coagulation becomes shorter, therefore the pore diameter toward the support surface side is unlikely to become large.

As the support, a plastic film or a glass plate may be used. Examples of materials of the plastic film include polyester such as polyethylene terephthalate (PET), polycarbonate, acrylic resin, epoxy resin, polyurethane, polyamide, polyolefin, a cellulose derivative, and silicone. As the support, a glass plate or PET is preferable, and PET is more preferable.

The stock solution for forming a membrane may contain a solvent. A solvent having high solubility of the polymer to be used (hereinafter referred to as a "favorable solvent") may be used depending on the polymer to be used. As the solvent, a solvent which is quickly substituted with the coagulation liquid in a case where the membrane is immersed in the coagulation liquid is preferable. Examples of solvents include, in a case where the polymer is polysulfone or the like, N-methyl-2-pyrrolidone, dioxane, tetrahydrofuran, dimethylformamide, dimethylacetamide, and a mixed solvent thereof; in a case where the polymer is polyacrylonitrile or the like, dioxane, N-methyl-2-pyrrolidone, dimethylformamide, dimethylacetamide, dimethylsulfoxide, and a mixed solvent thereof in a case where the polymer is polyamide or the like, dimethylformamide, dimethylacetamide, or a mixed solvent thereof; and in a case where the polymer is cellulose acetate or the like, acetone, dioxane, tetrahydrofuran, N-methyl-2-pyrrolidone, and a mixed solvent thereof. Among these, N-methyl-2-pyrrolidone is preferably used.

In addition to the favorable solvent, the stock solution for forming a membrane preferably uses a solvent (hereinafter referred to as a "non-solvent") in which the solubility of the polymer is low but which is compatible with the favorable solvent. Examples of the non-solvent include water, cellosolves, methanol, ethanol, propanol, acetone, tetrahydrofuran, polyethylene glycol, and glycerin. Among these, water is preferably used.

It is sufficient that a concentration of the polymer in the stock solution for forming a membrane may be 5% by mass to 35% by mass, preferably 10% by mass to 30% by mass. By setting the concentration thereof to 35% by mass or less, sufficient permeability (for example, water permeability) can be imparted to the obtained porous membrane. By setting the concentration thereof to 5% by mass or more, the formation of a porous membrane which selectively allows substances to permeate can be secured. An amount of additive to be added is not particularly limited as long as the homogeneity of the stock solution for forming a membrane is not lost by the addition, but is generally 0.5% by volume to 10% by volume with respect to the solvent. In a case where the stock solution for forming a membrane contains a non-solvent and a favorable solvent, a proportion of the non-solvent to the favorable solvent is not particularly limited as long as a mixed solution can be maintained in a homogeneous state, but is preferably 1.0% by mass to 50% by mass, is more preferably 2.0% by mass to 30% by mass, and is even more preferably 3.0% by mass to 10% by mass.

In addition, in a stock solution for forming a membrane used of manufacturing a porous membrane including the polymer, which include one or more structural units selected from the group consisting of the structural unit represented by Formula (I) and the structural unit represented by Formula (II), and polyvinylpyrrolidone, polyvinylpyrrolidone is preferably included in an amount of 50% by mass to 120% by mass and more preferably included in an amount of 80% by mass to 110% by mass with respect to the total mass of the polymer. By using such a stock solution for forming a membrane, a porous membrane including polyvinylpyrrolidone in an amount of approximately 0.05% to 8.0% by mass is obtained. The amount of polyvinylpyrrolidone is reduced since polyvinylpyrrolidone is largely removed in a washing process.

Furthermore, in a case where the stock solution for forming a membrane contains lithium chloride as an additive, lithium chloride is preferably contained in an amount of 5% by mass to 20% by mass, and more preferably by 10% by mass to 15% by mass with respect to the total mass of polysulfone and polyethersulfone.

As the coagulation liquid, it is preferable to use a solvent having low solubility of the polymer used. Examples of such solvents include water; alcohols such as methanol, ethanol, and butanol; glycols such as ethylene glycol and diethylene glycol; aliphatic hydrocarbons such as ether, n-hexane, and n-heptane; and glycerols such as glycerin. Examples of preferred coagulation liquids include water, alcohols, and a mixture of two or more of these. Among these, water is preferably used.

After immersion in the coagulation liquid, it is also preferable to perform washing with a solvent different from the coagulation liquid which has been used. Washing can be carried out by immersing in a solvent. Diethylene glycol is preferable as a washing solvent. In a case of adding polyvinylpyrrolidone to the stock solution for forming a porous membrane, the remaining amount of polyvinylpyrrolidone in the membrane can be controlled by using diethylene glycol as a washing solvent and adjusting either or both of a temperature and an immersion time of diethylene glycol which is immersed in a film. After washing with diethylene glycol, the membrane may be further washed with water.

Regarding a method for manufacturing the porous membrane, reference can be made to JP1988-141610A (JP-S63-141610A), JP1992-349927A (JP-H04-349927A), JP1992-068966B (JP-H04-068966B), JP1992-351645A (JP-H04-351645A), JP1997-227714A (JP-H09-227714A), JP2010-235808A, and the like.

(Hydrophilization Treatment)

In a case of further performing a hydrophilization treatment with the hydroxyalkyl cellulose, it is sufficient that the porous membrane (substrate porous membrane) manufactured by the procedure described above is subjected to a hydrophilization treatment in which a hydrophilization liquid including the hydroxyalkyl cellulose is permeated in the porous membrane. The hydrophilized porous membrane may be further subjected to a washing treatment, a sterilization treatment, or the like.

The hydrophilization liquid can be prepared, for example, as a solution including the hydroxyalkyl cellulose. The solvent is not particularly limited as long as water or a solvent having a property of being miscible with water. The solvent may be a mixed solvent of water and an organic solvent. In a case of using the mixed solvent of water and an organic solvent, it is preferable that the organic solvent is at least one or more lower alcohols. Examples of the lower alcohol include alcohols having 5 or less carbon atoms, such as methanol, ethanol, propanol, isopropanol, butanol, ethylene glycol, propylene glycol, and glycerin. As the organic solvent, methanol, ethanol, or isopropanol is more preferable, and ethanol is even more preferable. It is particularly preferable that the solvent of the hydrophilization liquid is water.

The hydrophilization liquid may include a surfactant, a preservative, a membrane hardener such as polyphenol, and the like, in addition to the hydroxyalkyl cellulose and the solvent.

The method for permeating the hydrophilization liquid into the substrate porous membrane is not particularly limited, and examples thereof include an immersion method, a coating method, a transfer method, and a spray method. It is preferable that the permeation is performed such that the hydrophilization liquid permeates the entire porous membrane in the thickness direction at least at a portion where the hydrophilization is performed. Among these, an immersion method or a coating method is preferable. This is because the hydrophilization liquid can efficiently permeate the inside of the porous membrane.

It is preferable that the coating is performed such that the hydrophilization liquid permeates the entire porous membrane in the thickness direction. In a case of performing a coating using a plurality of hydrophilization liquids, it is sufficient that the hydrophilization liquid permeates the entire porous membrane in the thickness direction after coating all the hydrophilization liquids. In a case of covering only a part of the porous membrane, a coating method for applying the hydrophilization liquid to only a part needed to be covered can be performed. The coating of the hydrophilization liquid can be performed by a method for contacting a sponge or a cloth impregnated with the hydrophilization liquid to the surface of the porous membrane, or known methods such as a bead coating, a gravure coating, and a wire bar coating.

In the immersion method, the porous membrane is impregnated with the hydrophilization liquid by immersing the porous membrane in the hydrophilization liquid. After immersing, it is sufficient that the excess hydrophilization liquid is removed by pulling up the porous membrane from the hydrophilization liquid.

The immersion may be performed under pressure. By applying pressure, the hydrophilization liquid can be efficiently injected into each pore of the porous membrane.

The immersion time or pressure time in a case of the immersion treatment or pressure treatment is not particularly limited, but is generally approximately 0.5 seconds to 1 minute and preferably approximately 0.5 seconds to 30 seconds. The immersion time can be reduced according to the selection of solvent and the like.

The amount of hydroxyalkyl cellulose adhered can be appropriately adjusted depending on the immersion time of the porous membrane in the hydrophilization liquid or the concentration of the hydroxyalkyl cellulose in the hydrophilization liquid.

(Drying and Heating)

After the permeation of the hydrophilization liquid into the porous membrane, it is preferable to volatilize and remove the solvent in the hydrophilization liquid by drying. Examples of drying means include heat drying, air drying, and reduced-pressure drying, and the drying means is not particularly limited but is preferably air drying or heat drying from the viewpoint of the simplicity of the manufacturing process. The drying may be achieved by simply allowing to stand.

(Washing)

After the drying, it is preferable to perform washing using a washing solvent. This is because excess hydroxyalkyl cellulose and the like can be removed. In addition, by the washing, it is possible to remove unnecessary components included in the porous membrane as a raw material. The washing method is not particularly limited, and it is sufficient that the washing solvent is permeated into the membrane surface and pores surface of the porous membrane by immersion or pressure method, and then removed. As the washing solvent, the solvents exemplified as the solvent of the hydrophilization liquid can be exemplified. The permeation and removal of the washing solvent may be performed twice or more. At this time, in the two or more washings, the washing solvents may be the same as or different from each other, by are preferably different from each other. It is preferable that the washing solvent used at the end of the washing is water. In particular, it is preferable to immerse in water. This is for removing organic solvent components such as alcohol.

It is sufficient that the porous membrane after washing is dried again by the above-described procedure.

(Sterilization Treatment)

As a sterilization treatment of the porous membrane, for example, a high-pressure steam sterilization treatment can be performed. In particular, it is preferable to perform a treatment with high-temperature and high-pressure steam using an autoclave. Normally, a high-pressure steam sterilization treatment of plastics is performed by pressurizing with saturated steam and treating in an environment of approximately 110° C. to 140° C. for 10 to 30 minutes, and the sterilization treatment of the porous membrane according to the embodiment of the present invention can be performed under the same conditions. Examples of the autoclave used for the sterilization treatment include LSX-700 manufactured by TOMY SEIKO CO., LTD.

<Application of Porous Membrane>

The porous membrane according to the embodiment of the present invention can be used in various applications as a filtration membrane. The filtration membrane is applied to the separation, purification, recovery, concentration, and the like of a liquid containing or suspending various polymers, microorganisms, yeasts, and fine particles, and particularly, can be applied to a case where it is necessary to separate fine particles from a liquid containing fine particles, which is required to filtration. For example, the filtration membrane can be used in a case where fine particles are separated from various suspensions, fermentation liquids, culture solutions, or the like, which contain fine particles, and suspensions of pigment. Specifically, the porous membrane according to the embodiment of the present invention can be used as a microfiltration membrane required for manufacturing pharmaceuticals in the pharmaceutical industry, manufacturing alcoholic beverages such as beer in the food industry, fine processing in the electronics industry, and manufacturing purified water.

In a case where the porous membrane according to the embodiment of the present invention, which has a pore diameter distribution, is used as a filtration membrane, by arranging and filtering such that a portion having a smaller pore diameter is closer to an outlet side of a filtrate, fine particles can be efficiently captured. In addition, since the porous membrane has a pore diameter distribution, fine particles introduced from the surface are removed by adsorption or adhesion before reaching the minimum pore diameter portion. Therefore, clogging hardly occurs, and high filtration efficiency can be maintained for a long period of time.

The porous membrane according to the embodiment of the present invention can be processed into a shape according to the application, and can be used for various applications. Examples of the shape of the porous membrane include flat membrane shape, tubular shape, hollow fiber shape, pleated shape, fibrous shape, spherical shape, crushed particle shape, and bulky continuous shape. The porous membrane may be processed into a shape according to the application before the hydrophilization treatment, or may be processed into a shape according to the application after the hydrophilization treatment.

The porous membrane may be attached to a cartridge which is easily removable in devices used for various applications. It is preferable that the porous membrane is retained in the cartridge in a form capable of functioning as a filtration membrane. The cartridge retaining the porous membrane can be manufactured in the same manner as a known porous membrane cartridge, and regarding the cartridge, reference can be made to WO2005/037413A and JP2012-045524A.

For example, a filter cartridge can be manufactured as follows.

A long porous membrane is pleated such that the porous membrane is creased in the short side (width) direction. For example, the porous membrane can be pleated by a known method, usually sandwiched between two membrane supports. As the membrane support, a non-woven fabric, a woven fabric, a net, or the like may be used. The membrane support functions to reinforce the filtration membrane against fluctuations in filtration pressure and to introduce liquid into the fold. It is sufficient that the width of the pleat fold is, for example, 5 mm to 25 mm. It is sufficient that the pleated porous membrane is rounded into a cylindrical shape, and the joint is sealed.

The cylindrical porous membrane is end-sealed to an end plate, and the end seal may be performed by a known method according to the material of the end plate. In a case where a thermosetting epoxy resin is used for the end plate, a liquid of a prepared epoxy resin adhesive may be poured into a positive mold and pre-cured so as to moderately increase the viscosity of the adhesive, one end surface of a cylindrical filter medium may be inserted into the epoxy adhesive, and then the liquid may be heated to be completely cured. In a case where the material of the end plate is a thermoplastic resin such as polypropylene or polyester, a method of inserting one end surface of the cylindrical filter medium into a hot-melted resin immediately after pouring the hot-melted resin into the mold may be performed. On the other hand, only a surface of the plate may be melted by contacting only the sealing surface of the formed end plate with a hot plate or irradiating with an infrared heater, and one end surface of the cylindrical filter medium may be pressed and welded to the molten surface of the plate.

The assembled filter cartridge may be further subjected to a known washing process.

In the filter cartridge, the hydroxyalkyl cellulose in the porous membrane may be partially or entirely dissolved and removed in the solvent used in the washing process or the like.

EXAMPLES

Features of the present invention will be described in more detail with reference to the following examples and comparative examples. The materials, amounts used, proportions, treatment details, treatment procedures, and the like described in the following examples can be appropriately modified as long as the gist of the invention is maintained. Therefore, the scope of the invention should not be limitedly interpreted by the specific examples described below.

<Production of Porous Membranes of Examples 1 to 5 and Comparative Examples 1 to 4 and Substrate Porous Membranes of Examples 6 to 23>

Porous membranes were manufactured by the following procedure with reference to JP1997-227714A (JP-H09-227714A).

A stock solution for forming a membrane was obtained by uniformly dissolving 12.74 parts by mass of polysulfone, 0.26 parts by mass of polyethersulfone, and 14 parts by mass of polyvinylpyrrolidone in 73 parts by mass of N-methyl-2-pyrrolidone. Udel P-3500LCD manufactured by Solvay was used as polysulfone, Sumika Excel PES 5200P manufactured by Sumitomo Chemical Co., Ltd. was used as polyethersulfone, and PITZCOL K-50 manufactured by DKS Co., Ltd. was used as polyvinylpyrrolidone. The stock solution was filtered through a filter having an absolute filtration accuracy of 3 µm, and then cast through a casting coater such that a thickness on a glass plate was 200 µm. The liquid membrane was allowed to stand in the air at a wind speed of 2.0 m/s at 40° C. (relative humidity: 65%) for 10 seconds, and immediately immersed in a coagulation bath of water at 20° C. to produce a porous membrane. The formed porous membrane was peeled off from the glass plate. The obtained porous membrane was put into a diethylene glycol bath for 120 seconds, and then thoroughly washed with pure water. Drying was performed to obtain a porous membrane of Example 1. Furthermore, porous membranes (substrate porous membranes before a treatment with a hydrophilization liquid of Examples 6 to 23) of Examples 2 to 23 and Comparative Examples 1 to 4 were obtained by changing the ratio of polysulfone to polyethersulfone used (that is, the mass ratio of the structural unit represented by Formula (I) and the structural unit represented by Formula (II)). The minimum pore diameter was measured with a perm-porometer manufactured by POROUS MATERIALS (USA) with regard to the obtained porous membrane, and all of the minimum pore diameter was 0.2 µm. In addition, the thickness of the porous membrane after drying was measured using captured images of a scanning electron microscope (SEM) of a cross section of the membrane, and all of the thickness was approximately 140 µm and the porous membrane had an asymmetric structure having a compact portion inside.

<Production of Porous Membranes of Examples 6 to 23>

The porous membrane obtained as described above was used as substrate porous membrane. Each of the substrate porous membrane was subjected to a hydrophilization treatment using a hydrophilic polymer shown in Table 1.

SL grade (molecular weight: 100,000) and SSL grade (molecular weight: 40,000) manufactured by NIPPON SODA CO., LTD. were used as hydroxypropyl cellulose. L grade (molecular weight: 90,000) manufactured by SAN-SHO Co., Ltd. was used as hydroxyethyl cellulose. Any of these compounds was added to pure water, and stirred until being completely dissolved to prepare a hydrophilization liquid. The porous membrane as a substrate was immersed in the hydrophilization liquid from a primary surface, and the hydrophilization treatment was performed by immersing the entire membrane for 27 seconds in the hydrophilization liquid. After the hydrophilization treatment, washing was performed to remove excess hydrophilic polymer. After being immersed in pure water at 25° C. for 5 minutes, the samples were dried in a temperature environment of 70° C. for 24 hours to obtain porous membranes of Examples 6 to 23.

<Evaluation of Porous Membrane>

Each of the obtained porous membranes of Examples 1 to 23 and Comparative Examples 1 to 4 was measured for each property as described below, and further evaluated for hydrophilicity and hardness. The following integrity test and evaluation of water permeability are indicators of hydrophilicity, and tensile strength is an indicator of hardness. The results are shown in Table 1.

[Content Ratio of Polysulfone and Polyethersulfone]

A part of the porous membrane was dissolved in deuterated N,N-dimethylformamide (heavy DMF), and $^1$H-NMR was measured. $^1$H-NMR (proton nuclear magnetic resonance) was performed at 400 MHz and 256 times of integration using AVANCE II 400 manufactured by Burker. The abundance ratio was calculated from the integral ratio of the signal derived from polysulfone, appearing at around 8.0 ppm, to the signal derived from polyethersulfone, appearing at around 8.1 ppm, and the mass ratio was calculated based on the molecular weight (442) of the polysulfone unit and the molecular weight (232) of the polyethersulfone unit. The signals in NMR refer to protons (4H) near a sulfonyl group in the polymer.

[Amount of Hydrophilic Polymer in Porous Membrane]

The porous membrane was cut out into five membranes having 1 cm square and measured for mass, and then immersed in 1 ml of methanol for 30 minutes. The liquid was evaluated by liquid chromatograph/charged aerosol detector (LC/CAD). The conditions are as follows.

Sample: solution in which a predetermined amount of hydroxyalkyl cellulose was dissolved in methanol (20/50/100 ppm)

Equipment: ACQUITY UPLC H-Class manufactured by Waters

Column: Presto FF-C18 150×4.6 mm

Detector: CAD (Corona Ultra RS manufactured by Thermo Fisher Scientific)

Eluant: solution A: water, solution B: acetonitrile

Elution conditions: 5 to 90% B (0 to 15 min), 0.4 ml/min, 37° C.

In a case of measuring under the conditions, the amount of the hydrophilic polymer in the porous membrane was calculated using an area ratio of a hydroxyalkyl cellulose peak detected at a retention time of 8.5 to 12.5 minutes to a peck obtained from the sample.

[Integrity Test]

The porous membrane was sandwiched between two polypropylene non-woven fabrics and pleated to a fold having a width of 10 mm, 138 folds were taken out and rounded into a cylindrical shape, and the joint was welded with an impulse sealer. Both ends of the cylinder were cut off at 5 mm each, and the cut sections were heat-welded to an end plate formed of polypropylene to complete a filter cartridge having a membrane length of 30 inches.

The obtained filter cartridge was attached to a housing, water was passed through the cylinder of the filter cartridge in a direction from the inside to the outside at a rate of 8 L/min for 200 seconds, and the water in the housing was drained at atmospheric pressure by opening a leaking valve at the top of the housing. Subsequently, an air pressure of 150 kPa was applied from the water inlet side, and the amount of air (air flow rate) passing through the filtration filter cartridge was measured. Based on the measured values, the integrity was evaluated according to the following criteria. A to D are practical levels.

A: more than 0 ml/min to 30 ml/min or less
B: more than 30 ml/min to 60 ml/min or less
C: more than 60 ml/min to 90 ml/min or less
D: more than 90 ml/min to 120 ml/min or less
E: more than 120 ml/min

[Water Permeability]

Water permeability was evaluated using water permeability in which the porous membrane subjected to the hydrophilization treatment was cut into a circle having a diameter of 47 mm from a central region (region of 15 cm in the center of 200 cm in the long side in a region of 10 cm in the center in the short side of 25 cm) and a pressure of 100 kPa was applied thereto to allow pure water to pass through the primary surface. The volume of water flowing through the membrane per unit area for 1 minute was measured and determined as water permeability (ml/cm$^2$/min). At this time, the rate of change was determined based on a porous membrane of 100% polysulfone, and water permeability was evaluated in the following four levels. The value is considered to reflect an increase in water permeability due to the addition of polyethersulfone and a decrease in water permeability due to the immersion of hydroxyalkyl cellulose.

A: increase of 10% or more
B: increase of 5% or more and less than 10%
C: decrease less than 5% or increase less than 5%
D: decrease of 5% or more and less than 10%
E: decrease of 10% or more

[Tensile Strength]

Using a tensile tester, the membrane was set to a width of 15 mm and a length of 150 mm, and the hardness in a case of being broken was determined as a tensile speed of 10 mm/min.

Based on the measured values, the tensile strength was evaluated in the following four levels. A to D are practical levels.

A: 6 kgf/cm$^2$ or more
B: 5.6 kgf/cm$^2$ or more and less than 6 kgf/cm$^2$
C: 5.3 kgf/cm$^2$ or more and less than 5.6 kgf/cm$^2$
D: 5 kgf/cm$^2$ or more and less than 5.3 kgf/cm$^2$
E: less than 5 kgf/cm$^2$

TABLE 1

| | Composition of porous membrane | | | b: amount of | | Hydrophilization liquid | |
|---|---|---|---|---|---|---|---|
| | Polysulfone (wt %) | a: polyethersulfone (wt %) | Hydrophilic polymer | hydrophilic polymer in membrane (wt %) | Molecular weight | Concentration of hydrophilic polymer | a × b |
| Example 1 | 99 | 1 | — | — | — | — | 0 |
| Example 2 | 98 | 2 | — | — | — | — | 0 |
| Example 3 | 95 | 5 | — | — | — | — | 0 |
| Example 4 | 93 | 7 | — | — | — | — | 0 |
| Example 5 | 91 | 9 | — | — | — | — | 0 |
| Example 6 | 98 | 2 | Hydroxypropyl cellulose | 0.200 | 100,000 | 0.08 | 0.4 |
| Example 7 | 98 | 2 | Hydroxypropyl cellulose | 0.250 | 100,000 | 0.085 | 0.5 |
| Example 8 | 98 | 2 | Hydroxypropyl cellulose | 0.400 | 100,000 | 0.13 | 0.8 |
| Example 9 | 98 | 2 | Hydroxypropyl cellulose | 0.800 | 100,000 | 0.24 | 1.6 |

| | Integrity test (ml/min) | Integrity evaluation | Water permeability (ml/cm$^2$/min) | Comparison of water permeability | Water permeability evaluation | Tensile strength (kgf/cm$^2$) | Tensile strength evaluation |
|---|---|---|---|---|---|---|---|
| Example 1 | 94 | D | 58 | Increase of 7% | B | 6.3 | A |
| Example 2 | 90 | C | 62 | Increase of 15% | A | 6.3 | A |
| Example 3 | 84 | C | 65 | Increase of 20% | A | 6.0 | A |
| Example 4 | 75 | C | 66 | Increase of 22% | A | 5.7 | B |
| Example 5 | 70 | C | 67 | Increase of 24% | A | 5.4 | C |
| Example 6 | 61 | C | 61 | Increase of 13% | A | 6.3 | A |
| Example 7 | 35 | B | 61 | Increase of 13% | A | 6.3 | A |
| Example 8 | 24 | A | 60 | Increase of 11% | A | 6.3 | A |
| Example 9 | 15 | A | 53 | Decrease of 2% | C | 6.3 | A |

TABLE 1-continued

| | Composition of porous membrane | | | b: amount of | Hydrophilization liquid | | |
|---|---|---|---|---|---|---|---|
| | Polysulfone (wt %) | a: polyethersulfone (wt %) | Hydrophilic polymer | hydrophilic polymer in membrane (wt %) | Molecular weight | Concentration of hydrophilic polymer | a × b |
| Example 10 | 98 | 2 | Hydroxypropyl cellulose | 0.900 | 100,000 | 0.26 | 1.8 |
| Example 11 | 98 | 2 | Hydroxypropyl cellulose | 0.950 | 100,000 | 0.27 | 1.9 |
| Example 12 | 95 | 5 | Hydroxypropyl cellulose | 0.100 | 100,000 | 0.065 | 0.5 |
| Example 13 | 95 | 5 | Hydroxypropyl cellulose | 0.200 | 100,000 | 0.08 | 1 |
| Example 14 | 95 | 5 | Hydroxypropyl cellulose | 0.300 | 100,000 | 0.11 | 1.5 |
| Example 15 | 93 | 7 | Hydroxypropyl cellulose | 0.080 | 100,000 | 0.05 | 0.56 |
| Example 16 | 93 | 7 | Hydroxypropyl cellulose | 0.100 | 100,000 | 0.065 | 0.7 |
| Example 17 | 93 | 7 | Hydroxypropyl cellulose | 0.150 | 100,000 | 0.073 | 1.05 |
| Example 18 | 93 | 7 | Hydroxypropyl cellulose | 0.200 | 100,000 | 0.08 | 1.4 |

| | Integrity test (ml/min) | Integrity evaluation | Water permeability (ml/cm$^2$/min) | Comparison of water permeability | Water permeability evaluation | Tensile strength (kgf/cm$^2$) | Tensile strength evaluation |
|---|---|---|---|---|---|---|---|
| Example 10 | 14 | A | 52 | Decrease of 4% | C | 6.3 | A |
| Example 11 | 14 | A | 51 | Decrease of 6% | D | 6.3 | A |
| Example 12 | 40 | B | 64 | Increase of 19% | A | 6.0 | A |
| Example 13 | 27 | A | 61 | Increase of 13% | A | 6.0 | A |
| Example 14 | 22 | A | 57 | Increase of 6% | B | 6.0 | A |
| Example 15 | 42 | B | 65 | Increase of 20% | A | 5.7 | B |
| Example 16 | 30 | A | 64 | Increase of 19% | A | 5.7 | B |
| Example 17 | 26 | A | 62 | Increase of 15% | A | 5.7 | B |
| Example 18 | 22 | A | 59 | Increase of 9% | B | 5.7 | B |

| | Composition of porous membrane | | | b: amount of | Hydrophilization liquid | | |
|---|---|---|---|---|---|---|---|
| | Polysulfone (wt %) | a: polyethersulfone (wt %) | Hydrophilic polymer | hydrophilic polymer in membrane (wt %) | Molecular weight | Concentration of hydrophilic polymer | a × b |
| Example 19 | 91 | 9 | Hydroxypropyl cellulose | 0.060 | 100,000 | 0.04 | 0.54 |
| Example 20 | 91 | 9 | Hydroxypropyl cellulose | 0.100 | 100,000 | 0.065 | 0.9 |
| Example 21 | 91 | 9 | Hydroxypropyl cellulose | 0.120 | 100,000 | 0.068 | 1.08. |
| Example 22 | 91 | 9 | Hydroxypropyl cellulose | 0.200 | 100,000 | 0.08 | 1.8 |
| Example 23 | 98 | 2 | Hydroxyethyl cellulose | 0.400 | 90,000 | 0.14 | 0.8 |
| Comparative Example 1 | 100 | 0 | — | — | — | — | 0 |
| Comparative Example 2 | 90 | 10 | — | — | — | — | 0 |
| Comparative Example 3 | 40 | 60 | — | — | — | — | 0 |
| Comparative Example 4 | 0 | 100 | — | — | — | — | 0 |

| | Integrity test (ml/min) | Integrity evaluation | Water permeability (ml/cm$^2$/min) | Comparison of water permeability | Water permeability evaluation | Tensile strength (kgf/cm$^2$) | Tensile strength evaluation |
|---|---|---|---|---|---|---|---|
| Example 19 | 50 | B | 66 | Increase of 22% | A | 5.4 | C |
| Example 20 | 2.8 | A | 64 | Increase of 19% | A | 5.4 | C |

TABLE 1-continued

| | | | | | | | |
|---|---|---|---|---|---|---|---|
| Example 21 | 24 | A | 61 | Increase of 13% | A | 5.4 | C |
| Example 22 | 18 | A | 58 | Increase of 7% | B | 5.4 | C |
| Example 23 | 35 | B | 59 | Increase of 9% | B | 6.3 | A |
| Comparative Example 1 | 500 | E | 54 | 0% | C | 6.3 | A |
| Comparative Example 2 | 68 | C | 67 | Increase of 24% | A | 4.9 | E |
| Comparative Example 3 | 55 | B | 70 | Increase of 30% | A | 4.0 | E |
| Comparative Example 4 | 45 | B | 73 | Increase of 35% | A | 3.5 | E |

What is claimed is:

1. A porous membrane comprising:
a polysulfone consisting of a repetition of a structural unit represented by Formula (I) and polyethersulfone consisting of a structural unit represented by Formula (II), provided that a copolymer including the structural unit represented by Formula (I) and the structural unit represented by Formula (II) is excluded,
wherein a content of the polyethersulfone with respect to a total mass of the polysulfone represented by Formula (I) and the polyethersulfone represented by Formula (II) is 1% by mass or more and 7% by mass or less,
the partial structure in Formula (I) which corresponds to Formula (II) is not regarded as a polyethersulfone moiety when calculating the content of the polyethersulfone with respect to the total mass of the polyethersulfone and the polysulfone,
a content of a hydrophilic polymer is less than 0.800% by mass,
the hydrophilic polymer contains a hydroxyalkyl cellulose,
when the content of the structural unit represented by Formula (II) is a % by mass and a content of the hydroxyalkyl cellulose with respect to a mass of the porous membrane is b % by mass, the following expression is satisfied:

$0.5 \leq a \times b \leq 1.8$, a layered compact portion of which a pore diameter is minimum is provided at an inside of the porous membrane, and
the pore diameter continuously increases in a thickness direction from the compact portion toward at least one membrane surface of the porous membrane,

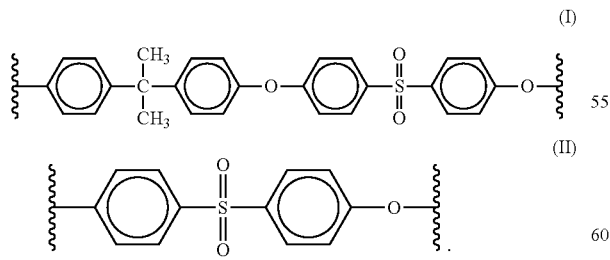

2. The porous membrane according to claim 1, wherein the hydroxyalkyl cellulose is hydroxypropyl cellulose.
3. The porous membrane according to claim 1, wherein a thickness is 10 μm to 500 μm.
4. The porous membrane according to claim 1, wherein an average pore diameter of the compact portion is 0.1 μm to 10 μm.
5. A filter cartridge comprising:
the porous membrane according to claim 1 as a filtration membrane.
6. A porous membrane comprising:
polysulfone consisting of a repetition of a structural unit represented by Formula (I), polyethersulfone consisting of a structural unit represented by Formula (II), and a hydroxypropyl cellulose, provided that a copolymer including the structural unit represented by Formula (I) and the structural unit represented by Formula (II) is excluded,
wherein a content of the polyethersulfone with respect to a total mass of the polysulfone represented by Formula (I) and the polyethersulfone represented by Formula (II) in the porous membrane is 1% by mass or more and 7% by mass or less,
the partial structure in Formula (I) which corresponds to Formula (II) is not regarded as a polyethersulfone moiety when calculating the content of the polyethersulfone with respect to the total mass of the polyethersulfone and the polysulfone,
a content of a hydrophilic polymer is less than 0.800% by mass,
when the content of the polyethersulfone is a % by mass and a content of the hydroxypropyl cellulose with respect to a mass of the porous membrane is b % by mass, the following expression is satisfied $0.5 \leq a \times b \leq 1.8$, a thickness is 10 μm to 500 μm,
a layered compact portion of which a pore diameter is minimum is provided at an inside of the porous membrane,
an average pore diameter of the compact portion is 0.1 μm to 10 μm, and
the pore diameter continuously increases in a thickness direction from the compact portion toward at least one membrane surface of the porous membrane,

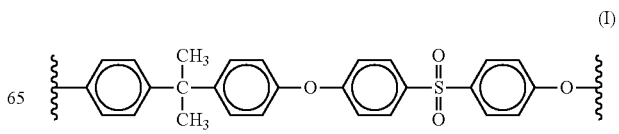

-continued

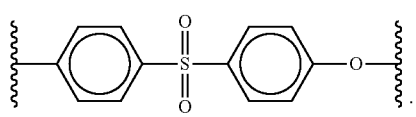
(II)

7. The porous membrane according to claim 1, retaining a hydroxyalkyl cellulose,
wherein the porous membrane consists essentially of polysulfone consisting of a repetition of a structural unit represented by Formula (I), polyethersulfone consisting of a structural unit represented by Formula (II), and polyvinylpyrrolidone.

8. The porous membrane according to claim 6, retaining a hydroxypropyl cellulose,
wherein the porous membrane consists essentially of polysulfone consisting of a repetition of a structural unit represented by Formula (I), polyethersulfone consisting of a structural unit represented by Formula (II), and polyvinylpyrrolidone.

9. The porous membrane according to claim 1,
wherein a layered compact portion of which a pore diameter is minimum is provided at an inside of the porous membrane, an average pore diameter of the compact portion is 0.05 μm to 10 μm.

10. The porous membrane according to claim 1,
wherein the following expression is satisfied $$0.5 \leq a \times b \leq 1.5.$$

11. The porous membrane according to claim 6,
wherein the following expression is satisfied $$0.5 \leq a \times b \leq 1.5.$$

* * * * *